United States Patent
Kim et al.

(12)

(10) Patent No.: US 6,464,639 B1
(45) Date of Patent: Oct. 15, 2002

(54) METHOD FOR MODELING AN INTERNAL OBJECT OF A HUMAN BODY AND APPARATUS THEREOF

(75) Inventors: Nam Kug Kim, Seoul; Yeong Ho Kim, Anyang-si; Jeong Ho Choi, Kyongki-do, all of (KR)

(73) Assignee: Cybermed, Inc., Seoul (KR)

( * ) Notice: Subject to any disclaimer, the term of this patent is extended or adjusted under 35 U.S.C. 154(b) by 6 days.

(21) Appl. No.: 09/694,566

(22) Filed: Oct. 24, 2000

(30) Foreign Application Priority Data

Oct. 25, 1999 (KR) ............................................. 99-46295

(51) Int. Cl.⁷ .................................................. A61B 8/00

(52) U.S. Cl. ........................ 600/443; 600/416; 600/437; 128/916

(58) Field of Search ................................ 600/443, 447; 128/916; 345/419, 423; 382/128; 164/128

(56) References Cited

U.S. PATENT DOCUMENTS

| | | | | |
|---|---|---|---|---|
| 5,435,310 A | * | 7/1995 | Sheehan et al. | 382/128 |
| 5,806,521 A | * | 9/1998 | Morimoto et al. | 600/447 |
| 5,871,019 A | * | 2/1999 | Belohlavek | 128/916 |
| 5,883,631 A | * | 3/1999 | Konno et al. | 345/423 |
| 6,145,804 A | * | 11/2000 | Baumann et al. | 164/128 |

* cited by examiner

*Primary Examiner*—Marvin M. Lateef
*Assistant Examiner*—Ruby Jain
(74) *Attorney, Agent, or Firm*—Lowe Hauptman Gilman & Berner, LLP

(57) ABSTRACT

A method for modeling an internal object of a human body includes the step of obtaining the original three-dimensional volume data of the internal object of a human body utilizing an ultrasonic imaging device. Thereafter, a desired area of the obtained original three-dimensional volume data is selected and the image quality of the desired area is enhanced. The desired area of the three-dimensional volume data is transformed into a fair shape data. The fair shape data is decimated while a modeled shape is maintained. Finally, a three-dimensional model is shaped using decimated shape data.

5 Claims, 1 Drawing Sheet

METHOD FOR MODELING AN INTERNAL OBJECT OF A HUMAN BODY AND APPARATUS THEREOF

BACKGROUND OF THE INVENTION

1. Field of the Invention

The present invention relates generally to a method for modeling an internal object of a human body and apparatus thereof, and more particularly to a method and apparatus that is capable of three-dimensionally modeling an internal object of a human body utilizing image data that is obtained through a ultrasonic imaging device.

2. Description of the Prior Art

In order to visually observe an internal object of a human body without an operation, Computed Tomography (CT), Magnetic Resonance Imaging (MRI), Magnetic Resonance Angiography (MRA), Positron Emission Tomography (PET), ultrasonography or the like can be utilized. Human diseases can be diagnosed and the growth of a fetus can be observed, by means of interpreting the image of the internal object of a human body, such as an internal organ or bone, obtained by one of the above-mentioned techniques.

U.S. Pat. No. 5,741,215 discloses a method for fabricating a prosthesis that resembles the missing, damaged or deformed portion of a bone utilizing a three-dimensional image obtained through CT. In accordance with the conventional method, a three-dimensional image can be obtained by synthesizing a plurality of tomograms obtained through CT, and a prosthesis conforming to the missing, damaged or deformed portion of a bone can be manufactured of biocompatible synthetic resin. The patented invention has an object of fabricating a prosthesis that is fitted into the missing, damaged or deformed portion.

Meanwhile, it may provide a pregnant woman and her offspring with various emotional benefits for them to obtain the three-dimensional model of a fetus. That is, when the pregnant woman sympathizes with a fetus while holding the model in her hands and seeing the model with her naked eyes, her affection for the fetus can-be enhanced and she can obtain emotional stability. In addition, for her offspring, the models of the stages of growth can be mementos that provide him with remembrance of a birth process.

However, the conventional technique is inapplicable to a fetus in that CT and MRI cannot be used for the fetus because of danger of radiation exposure and the image of the fetus should necessarily be amended to remove undesirable wrinkles therefrom.

SUMMARY OF THE INVENTION

Accordingly, the present invention has been made keeping in mind the above problems occurring in the prior art, and an object of the present invention is to provide a method that is capable of modeling an internal object of the human body in the form of a three-dimensional shape utilizing image data obtained through a ultrasonic imaging device.

Another object of the present invention is to provide an apparatus that is capable of modeling an internal object of the human body in the form of a three-dimensional shape utilizing image data obtained through an ultrasonic imaging device.

In order to accomplish the above object, the present invention provides a method for modeling an internal object of a human body, comprising the steps of: obtaining the original three-dimensional volume data of the internal object of a human body utilizing a ultrasonic imaging device; selecting a desired area of the obtained original three-dimensional volume data and enhancing the image quality of the set area; transforming the quality-enhanced, three-dimensional volume data into a fair shape data; decimating the three-dimensionally modeled shape data into a relatively small amount of data while maintaining the modeled shape; and shaping a three-dimensional model using decimated shape data.

In accordance with a feature of the present invention, the internal object of a human body is a fetus that is present in the body of a pregnant woman.

In accordance with a feature of the present invention, the internal object of a human body is an internal organ of a human body.

In accordance with a feature of the present invention, the shaping step is performed by means of a rapid prototyping process.

In accordance with a feature of the present invention, the method further comprises the step of smoothing the stepped portions of the decimated, three-dimensional shape.

In addition, the present invention provides an apparatus for modeling an internal object of a human body, comprising: imaging means for making an image of the internal object of a human body and outputting an original three-dimensional image data; control means for preprocessing the original three-dimensional image data, three-dimensionally modeling the preprocessed data, and decimating the three-dimensionally modeled data; and shaping means for forming a three-dimensional model using the decimated, modeled data.

In accordance with a feature of the present invention, the control means is a computer, and the ultrasonic imaging means and the shaping means are respectively connected to the computer.

In accordance with a feature of the present invention, the control means performs a three-dimensional modeling process and thereafter a smoothing process.

In accordance with a feature of the present invention, the shaping means is a rapid prototyping device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
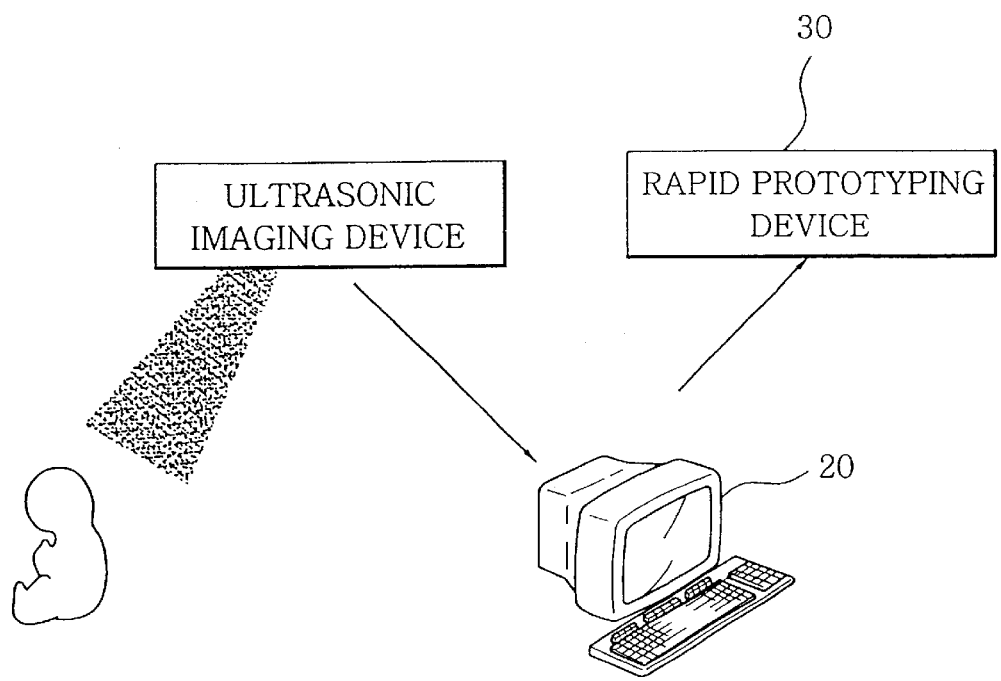
FIG. 1 is a schematic diagram showing the construction of an apparatus for modeling an internal object of a human body in accordance with the present invention.

First of all, there is described a method for modeling an internal object of a human body in accordance with the present invention.

In this specification, the internal object of a human body means a fetus or an internal organ, such as a liver or a heart, which is present in the interior of a human body. The model means an object, which is made of physical material, such as synthetic resin or metal, and has an identical or similar shape to the fetus or the internal organ.

In this invention, a three-dimensional image is made of the internal object of a human body using an ultrasonic imaging device. The ultrasonic imaging device is used to safely construct three-dimensional image of a fetus without the danger of radiation exposure. The original three-dimensional image is a sort of volume data in which a plurality of two-dimensional cross-sections are continuously stacked along a single axis.

The entire original three-dimensional image may be transformed into a model, but only a selected area of the original three-dimensional image is generally transformed into a model. For instance, in the case of a fetus his face can be selected as the area for modeling, and in the case of an internal organ a portion of it can be selected as the area for modeling. Therefore, a desired area should be selected on the original three-dimensional image. Thereafter, the inferior image quality of the selected area is enhanced. These preprocesses are described in"Marching cubes; A High Resolution 3D Surface Construction Algorithm", Computer Graphics, Vol. 21, 4, 1987, William E. Lorensen & Harvey E. Cline.

Cross-sections are stacked in the preprocessed data, so that the profile of the object is stepped and accordingly is not fair. Therefore, there is performed a three-dimensional modeling process in which the stepped profile of the object is transformed into the fair profile of the object by expressing the portions of same density fairly. The preprocessed data can be transformed into a fair shape data through the three-dimensional modeling process. The three-dimensional modeling process is described in"A Signal Processing Approach To Fair Surface Design", SIGGRAPH Proceedings '95, 1995, Gabriel Taubin.

The three-dimensionally modeled shape data is relatively large, so that the computer processing of the three-dimensionally modeled shape data is difficult. Therefore, there is performed a decimation process in which the size of a file is reduced by deleting the unnecessary portions of the modeled image data while maintaining the modeled shape. For instance, in a case where a plurality of dots constitute a plane, there can be performed a decimation process in which a minimum number of dots are maintained and the other dots are deleted. This decimation process is described in"Multi-resolution Analysis of Arbitrary Meshes", Computer Graphics, SIGGRAPH, 95 Proceedings, pp. 173–182, 1995, Matthias Eck, Tnoy DeRose et al.

In the meantime, a fetus has wrinkles on his multiple portions, so that the model of the wrinkled fetus may be displeasing to a viewer. In order to solve this problem, there is performed a smoothing process in which the decimated three-dimensional shape is smoothed by eliminating the wrinkles from the shape. This smoothing process is described in"A Signal Processing Approach To Fair Surface Design", SIGGRAPH Proceedings '95, 1995, Gabriel Taubin. However, since this process is not indispensable, this process is performed as occasion demands. For instance, when it is necessary to model an internal organ as it is, this smoothing process is not performed.

The decimated or smoothed shape data is shaped into a model using shaping means. A rapid prototyping device can be employed as the shaping means. The rapid prototyping device can shape a three-dimensional model by analyzing a three-dimensional shape into cross-sections and stacking the cross-sections. The rapid prototyping device is commercialized as the model name"Z-402" by Z-corp.

The rapid prototyping device shapes a model from synthetic resin, such as acrylic polymer or polyester, or high polymeric material, such as starch or wax. In such cases, the model shaped of starch or wax is not durable, and therefore a cast may be formed using a mould that is made on the basis of the model. The cast can be maintained for a relatively long time.

The rapid prototyping device embodies all or a portion of the internal object of a human body, such as a fetus or an internal organ, in a model. The model is finished through a post-process, such as surface treatment, coating or coloring. Hereinafter, there is described an apparatus for modeling the internal object of a human body in accordance with the present invention.

Referring to FIG. 1, a supersonograph 10 outputs a still image data of a fetus. The computer 20 transforms the output image data into a three-dimensional shape data through the performance of three-dimensional modeling, smoothing and decimation processes in accordance with a preset program and outputs the three-dimensional shape data. A rapid prototyping device 30 shapes a model using the output three-dimensional shape data.

Accordingly, the computer 20 should have memory capacity sufficient for processing the image data, and be provided with a high-speed processor that can perform a large number of calculations.

Figure 2:
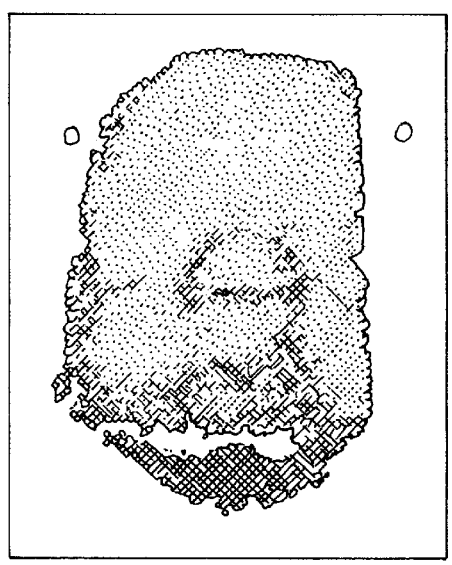
FIG. 2 is a photograph taken of a three-dimensional model that is obtained using the apparatus of the present invention.

FIG. 2 is a photograph taken of a three-dimensional model that is obtained using the apparatus of the present invention. In the photograph, the face area of the fetus is selected and is shaped into the model. An area shaped into a three-dimensional model can be formed in a variety of fashions.

As described above, the present invention provides a method and apparatus that is capable of modeling the internal object of the human body in the form of a three-dimensional shape using an ultrasonic apparatus. In particular, a pregnant woman's affection for the fetus can be enhanced and she can obtain emotional stability when she sympathizes with a fetus while holding a model in her hands and seeing the model with her naked eyes, and the models of the stages of growth can be mementos that provide her offspring with remembrance of a birth process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for modeling an internal object of a human body, comprising the steps of:

obtaining original three-dimensional volume data of the internal object of a human body utilizing an ultrasonic imaging device;

selecting a desired area of the original three-dimensional volume data and enhancing image quality of the desired area;

transforming the desired area of the three-dimensional volume data into a fair shape data;

decimating the fair shape data while maintaining a modeled shape; and shaping a three-dimensional model using decimated shape data.

2. The method according to claim 1, wherein said internal object of a human body is a fetus that is present in the body of a pregnant woman.

3. The method according to claim 1, wherein said internal object of a human body is an internal organ of a human body.

4. The method according to claim 1, wherein said shaping step is performed by means of a rapid prototyping process.

5. The method according to claim 1, further comprising the step of smoothing stepped portions of said decimated, three-dimensional shape.

* * * * *